United States Patent [19]

Kitagawa

[11] Patent Number: 4,531,598
[45] Date of Patent: Jul. 30, 1985

[54] MOVABLE ARTICLE DISCHARGER IN AN AUTOMATIC WEIGHING APPARATUS

[75] Inventor: Kazumi Kitagawa, Shiga, Japan

[73] Assignee: Kabushiki Kaisha Ishida Koki Seisakusho, Kyoto, Japan

[21] Appl. No.: 419,928

[22] Filed: Sep. 20, 1982

[30] Foreign Application Priority Data

Sep. 22, 1981 [JP] Japan .............................. 56-140765[U]

[51] Int. Cl.³ ...................... G01G 23/00; G01G 13/00
[52] U.S. Cl. ..................................... 177/128; 177/105
[58] Field of Search ............... 177/105, 106, 107, 108, 177/109, 110, 111, 112, 113, 128; 222/503; 221/15; 141/89, 91, 83, 284, 331, 344, 345, 231, 232, 233; 200/61.21

[56] References Cited

U.S. PATENT DOCUMENTS

| 2,333,790 | 10/1940 | Howard | 249/55 |
| 3,227,231 | 1/1966 | Parker | 177/110 |
| 3,946,772 | 3/1976 | Mize | 141/98 |
| 4,308,899 | 1/1982 | Misik . | |

Primary Examiner—E. A. Goldberg
Assistant Examiner—Patrick W. Foster
Attorney, Agent, or Firm—Staas & Halsey

[57] ABSTRACT

There is disclosed a movable timing hopper in an automatic weighing apparatus. The timing hopper is movable between an operating position below a chute of the automatic weighing apparatus and a nonoperating position remote from the operating position in which the timing hopper can be inspected or cleaned to remove any deposited articles.

4 Claims, 4 Drawing Figures

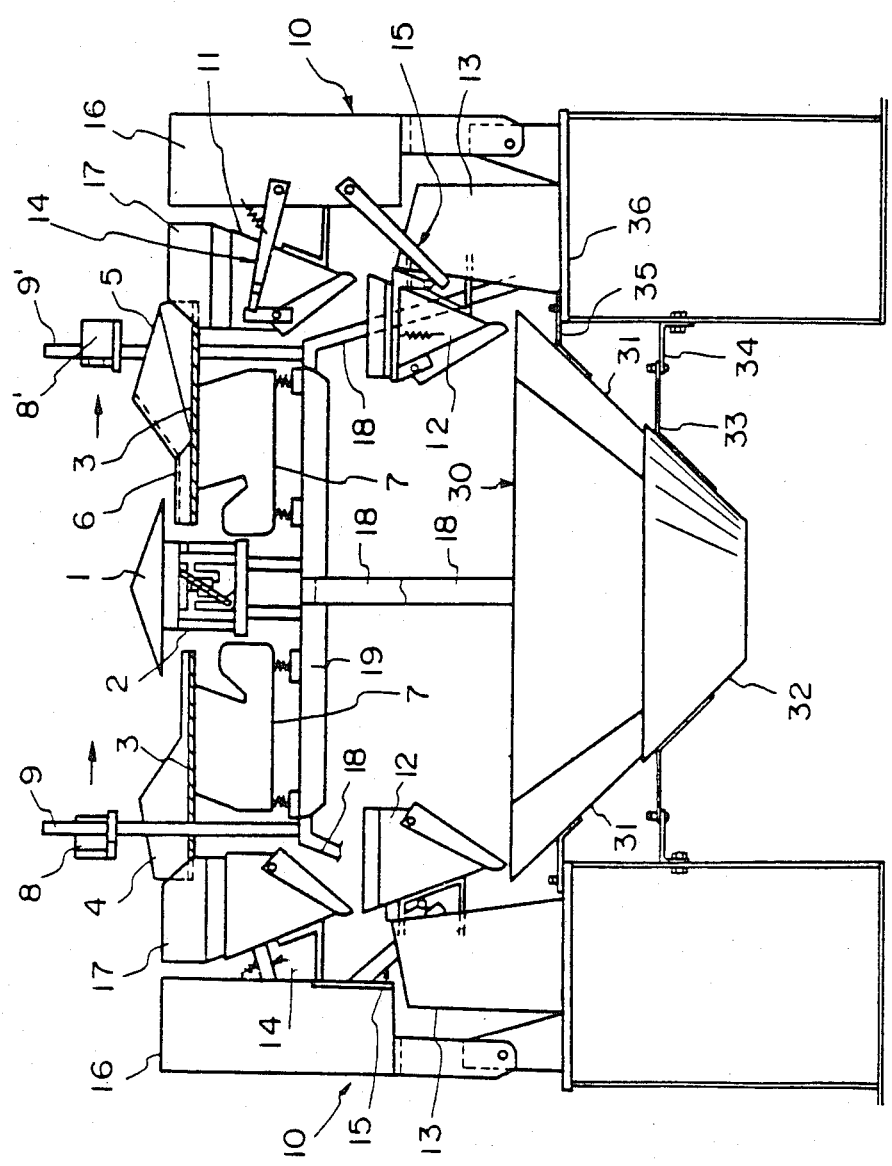

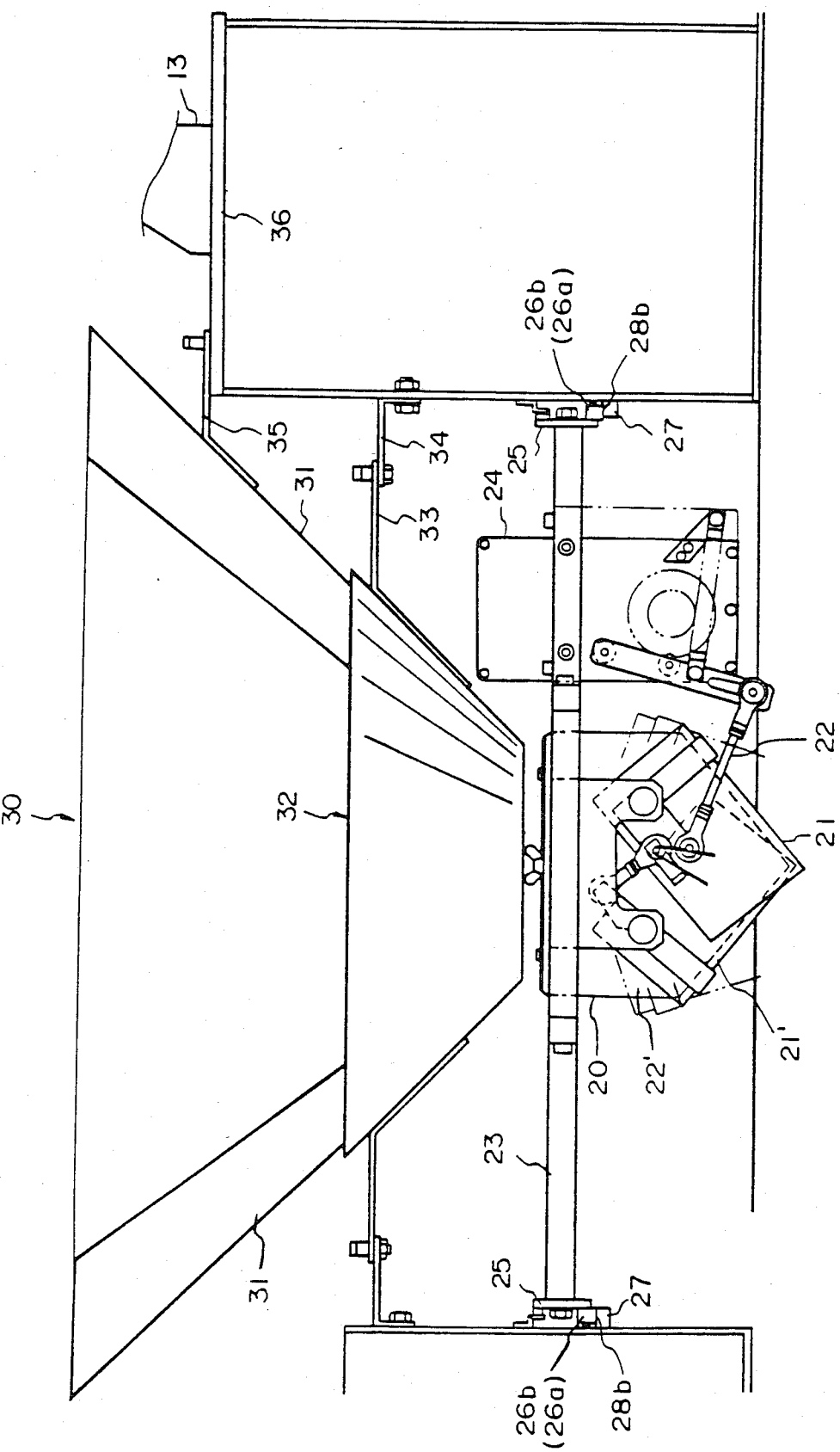

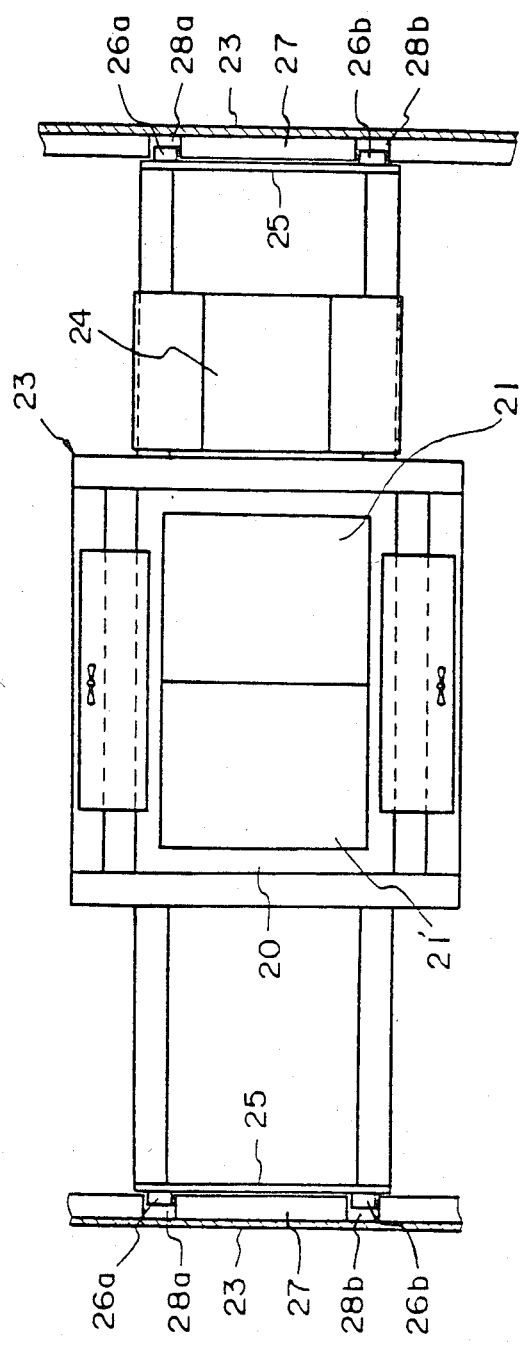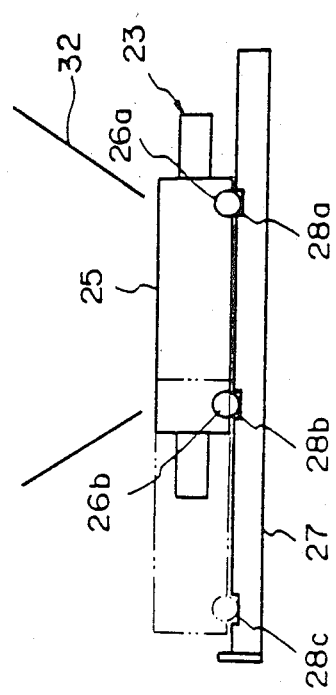

MOVABLE ARTICLE DISCHARGER IN AN AUTOMATIC WEIGHING APPARATUS

BACKGROUND OF THE INVENTION

The present invention relates to an automatic weighing apparatus, and more particularly to a combinatorial automatic weighing or counting apparatus comprising a plurality of weighing machines disposed in circumferentially spaced locations around a dispersing table and a collection chute for weighing or counting articles as supplied from the dispersing table to select an optimum combination of batches of articles and for discharging the selected batches of articles through the collection chute.

Known combinatorial automatic weighing apparatus have a timing hopper fixedly disposed below a collection chute. Where articles to be weighed are sticky in nature, or after the apparatus has been used over a long period of time, articles tend to remain stuck to the hoppers. The deposited articles need to be cleaned off the hoppers which are fixed in position, a process which is tedious and time-consuming. In addition, the fixed hoppers cannot be cleaned thoroughly. It would be possible to remove the hoppers each time they require cleaning. However, they could not be detached with ease, and would need an undue expenditure of much labor for their removal.

SUMMARY OF THE INVENTION

According to the present invention, an automatic weighing apparatus having a chute for supplying a batch of articles, comprises a timing hopper movable between a first position in which the batch of articles is supplied from the chute to the timing hopper disposed therebelow and a second position remote from the first position. When the timing hopper is pulled out into the second position, it can be inspected for wear or cleaned to remove any deposited articles.

It is an object of the present invention to provide an automatic weighing apparatus which comprises a movable timing hopper for discharging articles as received from a chute to a packing machine or the like, so that the timing hopper can be cleaned easily and thoroughly.

Another object of the present invention is to provide an automatic weighing apparatus which comprises a timing hopper than can be locked stably in either an operating position or a cleaning position.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a side elevational view of a conventional combinatorial automatic weighing apparatus;

FIG. 2 is an enlarged side elevational view of a timing hopper according to the present invention;

FIG. 3 is a plan view showing a support structure for the timing hopper illustrated in FIG. 2; and FIG. 4 is a side elevational view of a locking mechanism for the timing hopper of FIG. 2.

DESCRIPTION OF THE PREFERRED EMBODIMENT

FIG. 1 illustrates a conventional combinatorial automatic weighing apparatus having hoppers. The weighing apparatus comprises a dispersing table 1 of a conical shape supported on an electromagnetic vibratory device 2, and a plurality of radially extending supply troughs 3 arranged around the dispersing table 1 in angularly spaced relation, the supply troughs 3 having radially inward ends underlying an outer peripheral edge of the dispersing table 1 in close proximity thereto. Each supply trough 3 has a radial passage defined by a vertical inverted V-shaped wall 4 and a slanted wall including an inverted V-shaped wall portion 5 extending approximately two-thirds of the entire length of the slanted wall and inclined outwardly and a wall portion 6 extending approximately one-third of the entire length of the slanted wall along the vertical wall 4 of an adjacent one of the supply troughs 3. The slanted wall portions 5, 6 are disposed in overhanging relation to and spaced from the vertical wall 4 of the adjacent supply trough 3.

The supply troughs 3 are supported respectively on electromagnetic vibratory units 7. The electromagnetic vibratory device 2 and the electromagnetic vibratory units 7 are mounted on a support table 19 fixed to four support legs 18 secured to a frame 36. The support table 19 supports thereon a post 9 on which a light-emitting device 8 is mounted and a post 9' on which photodetector 8' is mounted, the posts 9, 9' being diametrically symmetrically positioned with respect to the dispersing table 1. The weighing apparatus further comprises a plurality of weighing machines 10 mounted on the frame 35 in angularly spaced relation and positioned radially outwardly of the supply troughs 3. Each of the weighing machines 10 is composed of a pool hopper 11 for receiving articles from the corresponding supply trough 3, a weighing hopper 12 for receiving the articles from the pool hopper 11, a weighing mechanism 13 for weighing the articles contained in the weighing hopper 12, and a driver unit 16 having lever mechanisms 15, 14 for opening and closing the weighing hopper 12 and the pool hopper 11. The pool hopper 11 has upper guide plates 17 between which a radially outward end of the supply trough 3 is located so that the articles can reliably fall off the supply trough 3 into the pool hopper 11. A collection chute 30 has a plurality of unit chutes 31 located in circumferentially spaced positions and having upper openings sized large enough to admit articles supplied from the weighing hoppers 12. The unit chutes 31 have lower ends projecting downwardly into a funnel-shaped lower chute 32, the unit chutes 31 being inclined at the same angle as that of inclination of the wall of the funnel-shaped lower chute 32. The unit chutes 31 are fastened to the frame 36 by brackets 35 fixed to lower inclined walls of the unit chutes 31. The lower chute 32 is secured to the frame 36 by brackets 33, 34.

In operation, articles supplied onto the dispersing table 1 are dispersed into the supply troughs 3 in response to operation of the electromagnetic vibratory device 2. The supply troughs 3 are vibrated by the electromagnetic vibratory units 7 to supply the articles from the supply troughs 3 into the corresponding pool hoppers 11, from which the articles are then allowed to fall into the associated weighing hoppers 12. The articles thus received in the weighing hoppers 12 are weighed in a variety of batch combinations of articles by an electronic circuit, which then selects a batch combination which gives a total article weight equal or closest to the preset weight. Then, those weighing hoppers 12 which correspond to such a selected batch combination are opened to discharge the articles therefrom into the chutes 30, 32, from which they are delivered onto a conveyor or packing machine (not shown). Articles are supplied onto the dispersing table 1 by a non-illustrated feed conveyor under the control of transmission or interruption of optical signals from the light-emitting device 8 to the photodetector 8', so that a constant number of articles will remain stocked at all times on the dispersing table 1.

FIGS. 2 through 4 show a timing hopper according to the present invention. Identical or corresponding parts shown in FIGS. 2 through 4 are denoted by identical or corresponding reference characters in FIG. 1.

As shown in FIG. 2, a timing hopper 20 is disposed below the lower chute 32 and has a lower opening openable and closable by a pair of covers 21, 21' swingable by a lever mechanism composed of levers 22, 22' positioned alongside of the covers 21, 21'. As illustrated in FIGS. 3 and 4, the timing hopper 20 is mounted substantially centrally in a square-shaped mount base 23. A driver mechanism 24 for driving the lever mechanism is located ajacent to the timing hopper 20. The mount base 23 has end plates 25, 25 on which rollers 26a, 26a, 26b, 26b are rotatably mounted at front and rear ends of the end plates 25, 25, the rollers 26a, 26a, 26b, 26b being rollingly disposed on rails 27, 27 attached to the support frame 36. The rails 27, 27 are of such a length that the timing hopper 20 can be moved laterally thereon to an outer position remote from a position below the lower chute 32. To stop the timing hopper 20 selectively in these positions, the rails 27, 27 have three pairs of recesses 28a, 28a, 28b, 28b, 28c, 28c spaced therealong for receiving portions of the rollers on the mount base 23, the recesses being shaped such that the rollers can forcibly be moved out of the recesses under an external force. When the timing hopper 20 is positioned below the lower chute 32, the rollers 26a, 26a, 26b, 26b on the mount base 23 are partly fitted in the recesses 28a, 28a, 28b, 28b, respectively, in the rails 27, 27, with the result that the timing hopper 20 is retained against movement in the position below the chute 32. When the timing hopper 20 is focibly pulled out, the rollers 26a, 26a, 26b, 26b are caused to roll along the rails 27, 27 until they fit into the recesses 28b, 28b, 28c, 28c. Therefore, the timing hopper 20 is retained in such an outer position against accidental displacement.

After a batch of articles has been supplied from the weighing hopper 12 into the timing hopper 20, the covers 21, 21' thereof are opened by the driver mechanism 24 through the lever mechanism 22, 22' driven thereby. The above discharging operation is repeated over and over for a long period of time. When it becomes necessary to inspect the timing hopper 20 for any wear or to clean away deposited articles, the timing hopper 20 or the mount base 23 is forcibly pulled out from below the lower chute 32 to the outer position, in which the timing hopper 20 is inspected or cleaned. After the inspecting or cleaning operation, the timing hopper 20 or the mount base 23 is pushed in along the rails until it is located below the lower chute 32. Then, the combinatorial weighing operation is carried out again.

As described above, the timing hopper 20 is supported for rolling movement along the rails 27, 27 and can be retained temporarily in position reliably against accidental displacement with the rollers 26a, 26a, 26b, 26b partly fitted selectively in the recesses 28a, 28a, 28b, 28b, 28c, 28c. The timing hopper 20 can be easily displaced by being forcibly pushed in or out to move the rollers over the edges of the recesses.

With the arrangement of the present invention, a timing hopper is movable from the operating position below the lower chute to the nonoperating or cleaning position remote from the operating position. In the nonoperating position, any deposited articles can be cleaned off the timing hopper easily and thoroughly.

Although a certain preferred embodiment has been shown and described in detail, it should be understood that many changes and modifications may be made therein without departing from the scope of the appended claims.

What I claim is:

1. An automatic weighing apparatus for a packing machine, comprising:
    weighing machines each having a weighing mechanism for weighing articles contained by said weighing machines;
    combination means, operatively coupled to said weighing machines, for combining weight values produced by respective ones of said weighing machines, and for selecting a combination of weighing machines whose weighed values give a total value equal or closest to a preset weight value and causing discharge of same;
    a chute, positioned below said weighing machines, for receiving articles discharged from the selected combination of weighing machines;
    a timing hopper disposed below said chute for receiving from said chute the articles discharged from the selected combination of weighing machines, and for discharging the articles into the packing machine, said timing hopper performing the receiving and discharging operations while positioned below said chute;
    a pair of parallel rails, one disposed on one side of said chute and the other disposed on the opposite side of said chute, said parallel rails having recesses formed at first and second positions thereof;
    rollers for rolling along said parallel rails;
    a mount base coupled to said rollers and being movable along said parallel rails via said rollers, said timing hopper being mounted on said mount base; and
    a driver mechanism, provided on said mount base, for driving said timing hopper during the receiving and discharging operations;
    when said mount base is positioned by engagement of said rollers in the recesses formed in said parallel rails at the first position thereof, said timing hopper receives the articles discharged from said chute and, in response to operation of said driver mechanism, is opened to discharge the articles into the packing machine, and when said mount base is positioned by engagement of said rollers in the recesses formed in said parallel rails at the second position thereof, said timing hopper is in a state where cleaning is possible.

2. An automatic weighing apparatus as recited in claim 1, wherein said timing hopper has a lower opening and a cover provided at the lower opening for opening and closing the lower opening, said apparatus further comprising a lever mechanism operatively linked to said driver mechanism and said cover.

3. An automatic weighing apparatus, comprising:
weighing means, having weighing mechanisms, for weighing articles and discharging a combination of articles closest to a preset weight;
a timing hopper, positioned below said weighing means in an operating position, for receiving and discharging the combination of articles at the operating position; and
means, on which said timing hopper is movable from the operating position to and from a non-operating position, for fixing said timing hopper in one of the operating and non-operating positions.

4. An automatic weighing apparatus as recited in claim 3, wherein said means for fixing comprises rails having recesses at the operating and non-operating positions and said timing hopper includes rollers moving on said rails and being held in the operating and non-operating positions by the recesses in said rails.

* * * * *

UNITED STATES PATENT AND TRADEMARK OFFICE
CERTIFICATE OF CORRECTION

PATENT NO. : 4,531,598
DATED : July 30, 1985
INVENTOR(S) : KITAGAWA

It is certified that error appears in the above-identified patent and that said Letters Patent is hereby corrected as shown below:

Col. 2

Line 35, "35" s/b --36--.

Col. 3

Lin 47, "focibly" s/b --forcibly--.

Signed and Sealed this

Twenty-sixth Day of November 1985

[SEAL]

Attest:

DONALD J. QUIGG

Attesting Officer     Commissioner of Patents and Trademarks